(12) United States Patent
Minata

(10) Patent No.: US 6,411,827 B1
(45) Date of Patent: Jun. 25, 2002

(54) RADIO SELECTIVE CALLING RECEIVER AND PORTABLE TELEPHONE APPARATUS FOR EFFICIENTLY MANAGING RECEIVED CALL

(75) Inventor: Shigeki Minata, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/226,917

(22) Filed: Jan. 5, 1999

(30) Foreign Application Priority Data

Jan. 5, 1998 (JP) .......................................... 10-000421

(51) Int. Cl.$^7$ .............................................. H04B 1/38
(52) U.S. Cl. ...................... 455/566; 455/412; 340/7.52; 340/7.55; 340/7.59
(58) Field of Search ............................... 455/31.1, 31.2, 455/31.3, 38.1, 38.2, 38.4, 566, 412, 413, 567; 340/825.44, 309.4, 7.55, 7.57, 7.6, 7.1, 7.52; 379/67

(56) References Cited

U.S. PATENT DOCUMENTS

| | | | | |
|---|---|---|---|---|
| 4,872,005 A | * | 10/1989 | DeLuca et al. ......... | 340/825.44 |
| 4,894,649 A | * | 1/1990 | Davis .................... | 340/825.44 |
| 4,896,306 A | * | 1/1990 | Sanbongi et al. ........... | 368/29 |
| 5,225,826 A | * | 7/1993 | DeLuca et al. ......... | 340/825.44 |
| 5,444,869 A | * | 8/1995 | Stricklin et al. .............. | 455/89 |
| 5,475,374 A | * | 12/1995 | Moore ................... | 340/825.44 |
| 5,748,100 A | * | 5/1998 | Gutman et al. ......... | 340/825.44 |
| 5,926,104 A | * | 7/1999 | Robinson ............... | 340/825.22 |
| 5,933,764 A | * | 8/1999 | Katayama .................. | 455/38.4 |
| 5,955,962 A | * | 9/1999 | Matsuura .................... | 455/38.2 |
| 5,959,542 A | * | 9/1999 | Ishida ........................ | 455/38.2 |
| 5,973,615 A | * | 10/1999 | Shima ..................... | 455/226.2 |
| 6,009,308 A | * | 12/1999 | Matsuura .................... | 455/31.3 |
| 6,032,053 A | * | 2/2000 | Schroeder et al. .......... | 455/553 |
| 6,052,563 A | * | 4/2000 | Macko ...................... | 455/38.2 |
| 6,320,948 B1 | * | 11/2001 | Heilmann et al. .......... | 379/189 |

FOREIGN PATENT DOCUMENTS

| | | |
|---|---|---|
| JP | 6-152499 | 5/1994 |
| WO | WO 92/15971 | 9/1995 |

* cited by examiner

*Primary Examiner*—Edward F. Urban
*Assistant Examiner*—Tilahun B Gesesse
(74) *Attorney, Agent, or Firm*—Sughrue Mion, PLLC

(57) ABSTRACT

A radio selective calling receiver comprising a receiving for receiving the radio calling signal containing sending user information that allows the receiving user to identify the sending user and assign a priority level to the sending user, a plurality of types of notifying for notifying the receiving user of the received radio calling signal in different manners, a time counting for setting up and counting the current time and date, an information storing for setting up and storing notification state information and time information through information inputting and information displaying for the receiving user, the notification state information representing a receiving operation and a notifying operation of the radio calling signal, the time information representing a valid date range and a valid time range of the receiving operation and the notifying operation, and a controlling for searching, collating, searching, comparing and controlling the notifying operations corresponding to the searched notification state information.

16 Claims, 15 Drawing Sheets

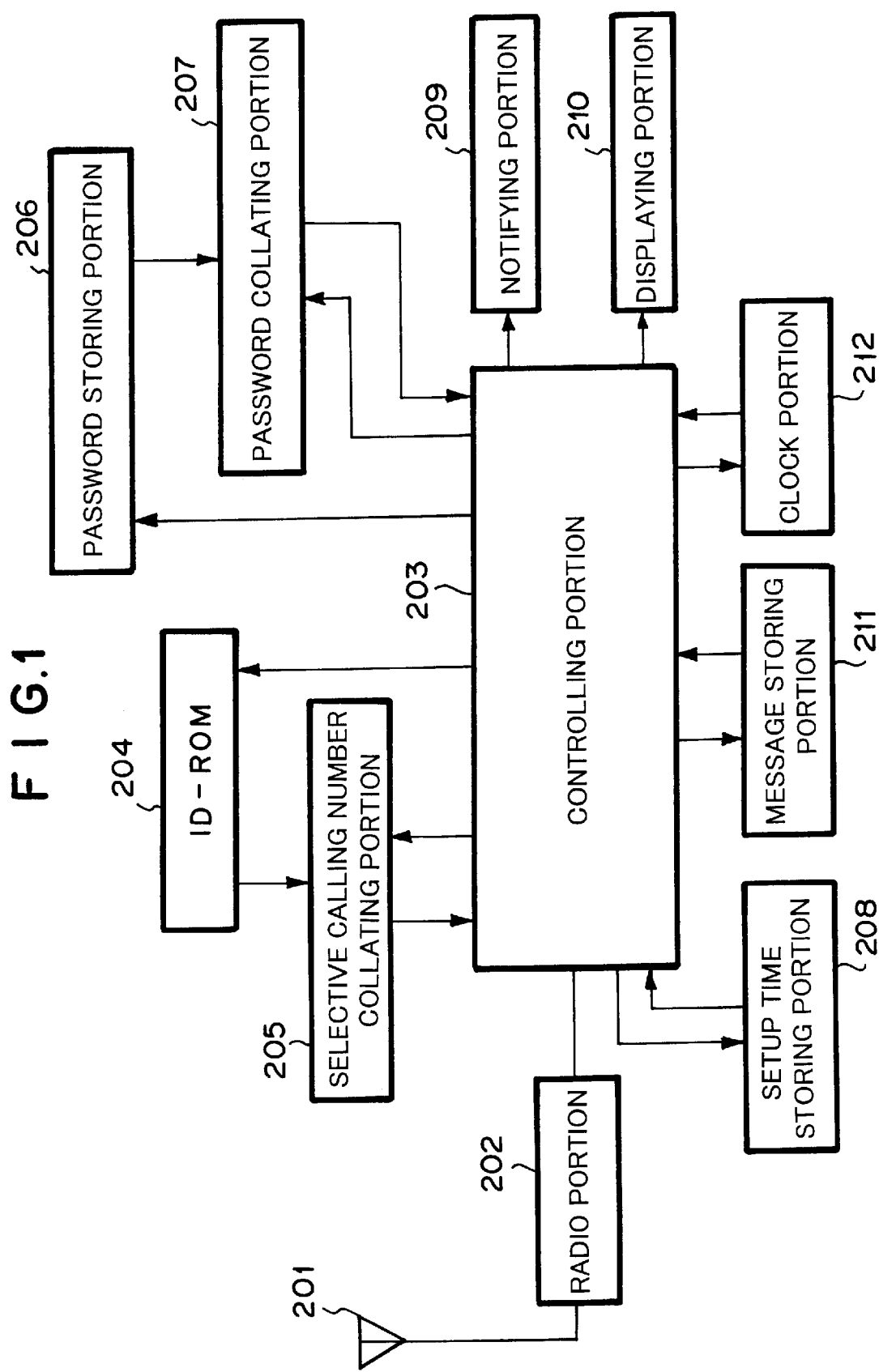

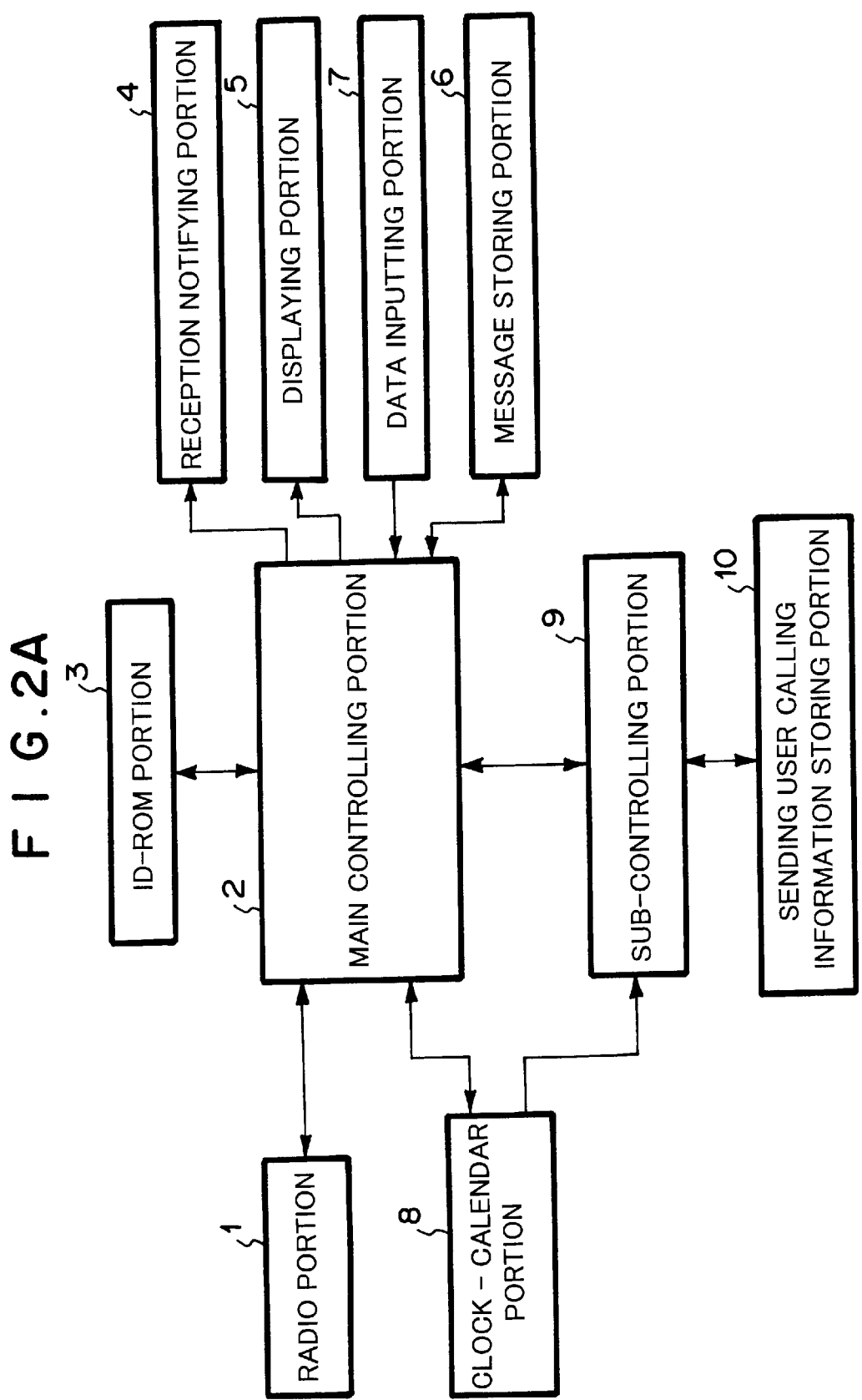

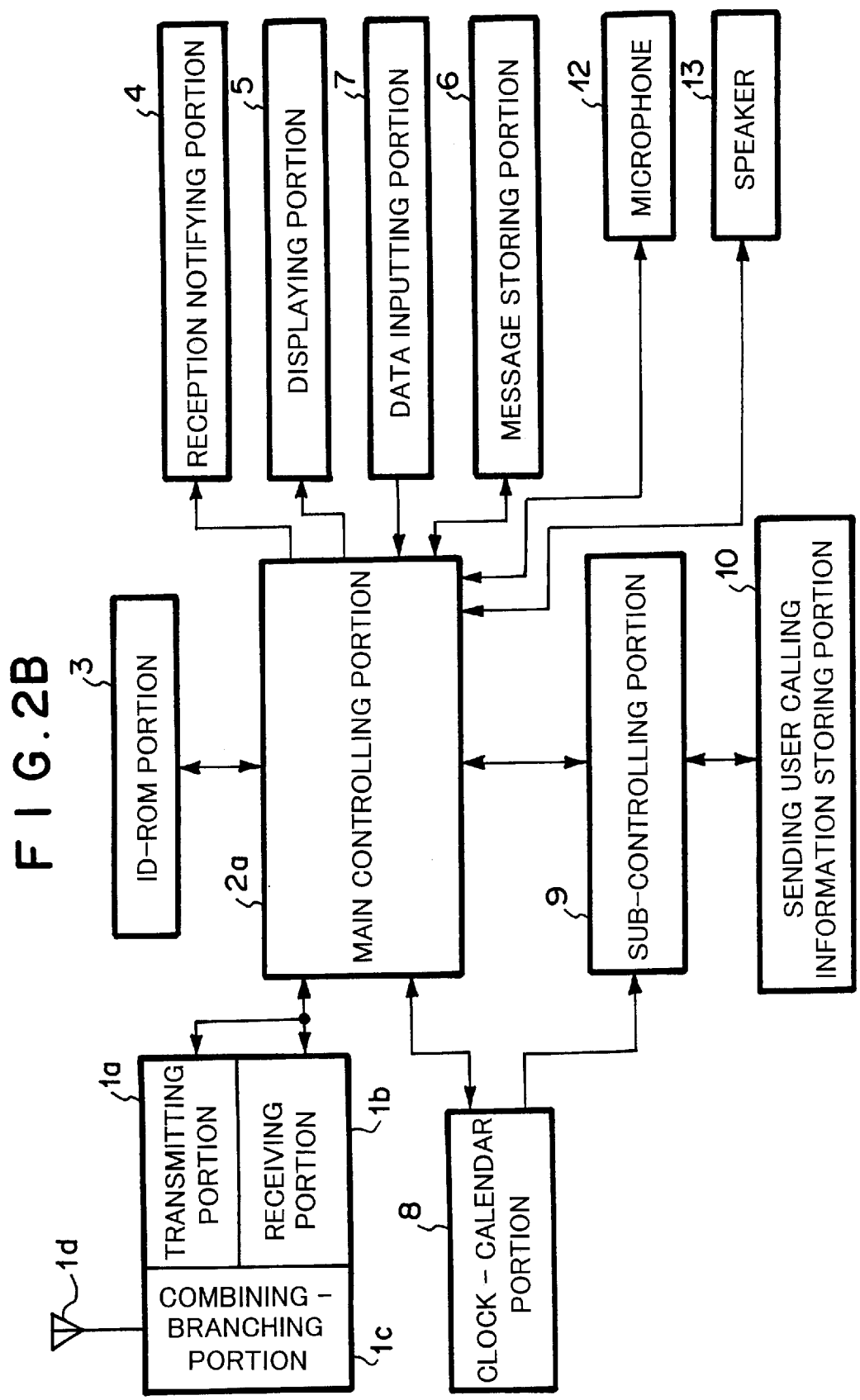

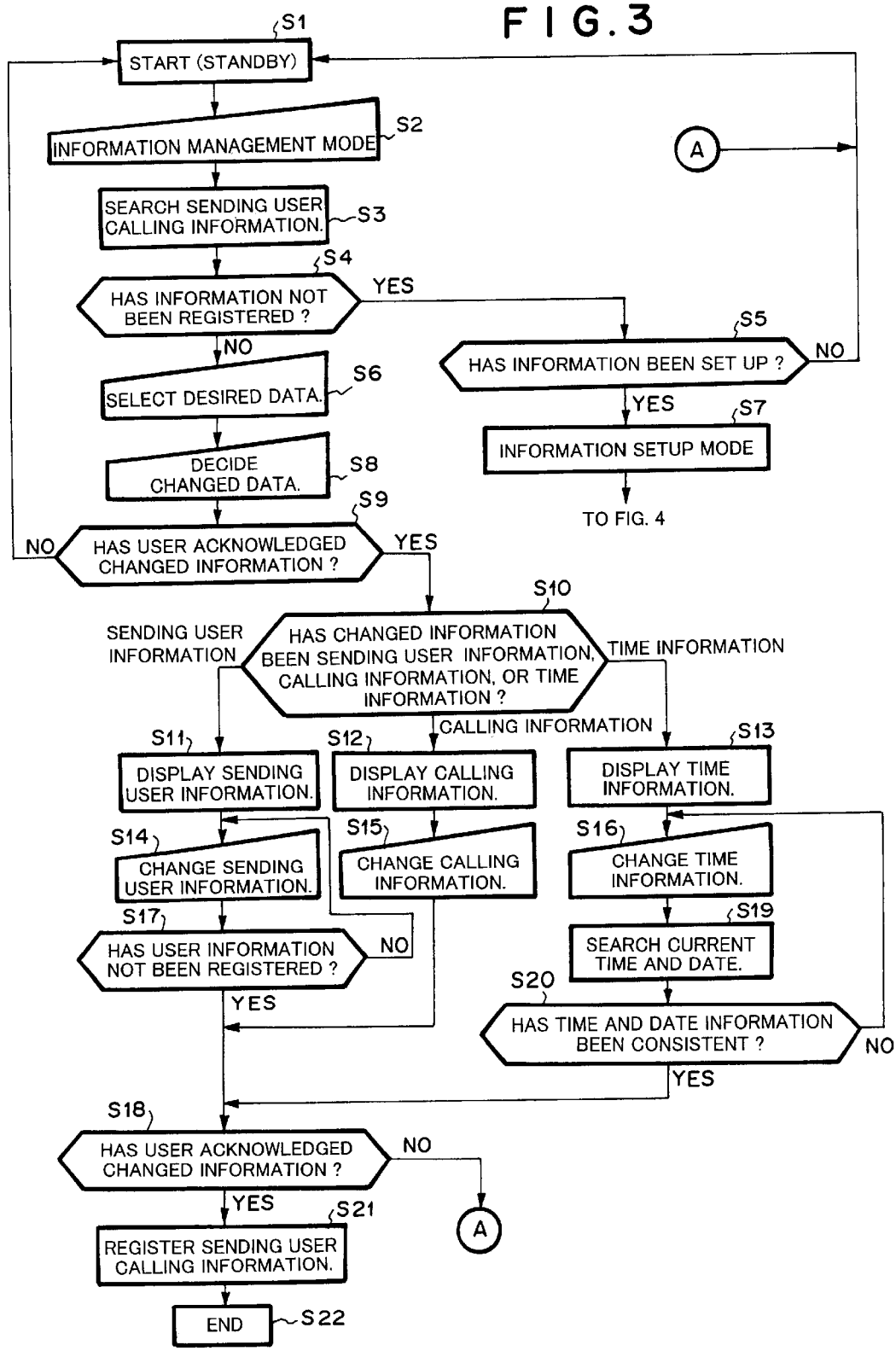

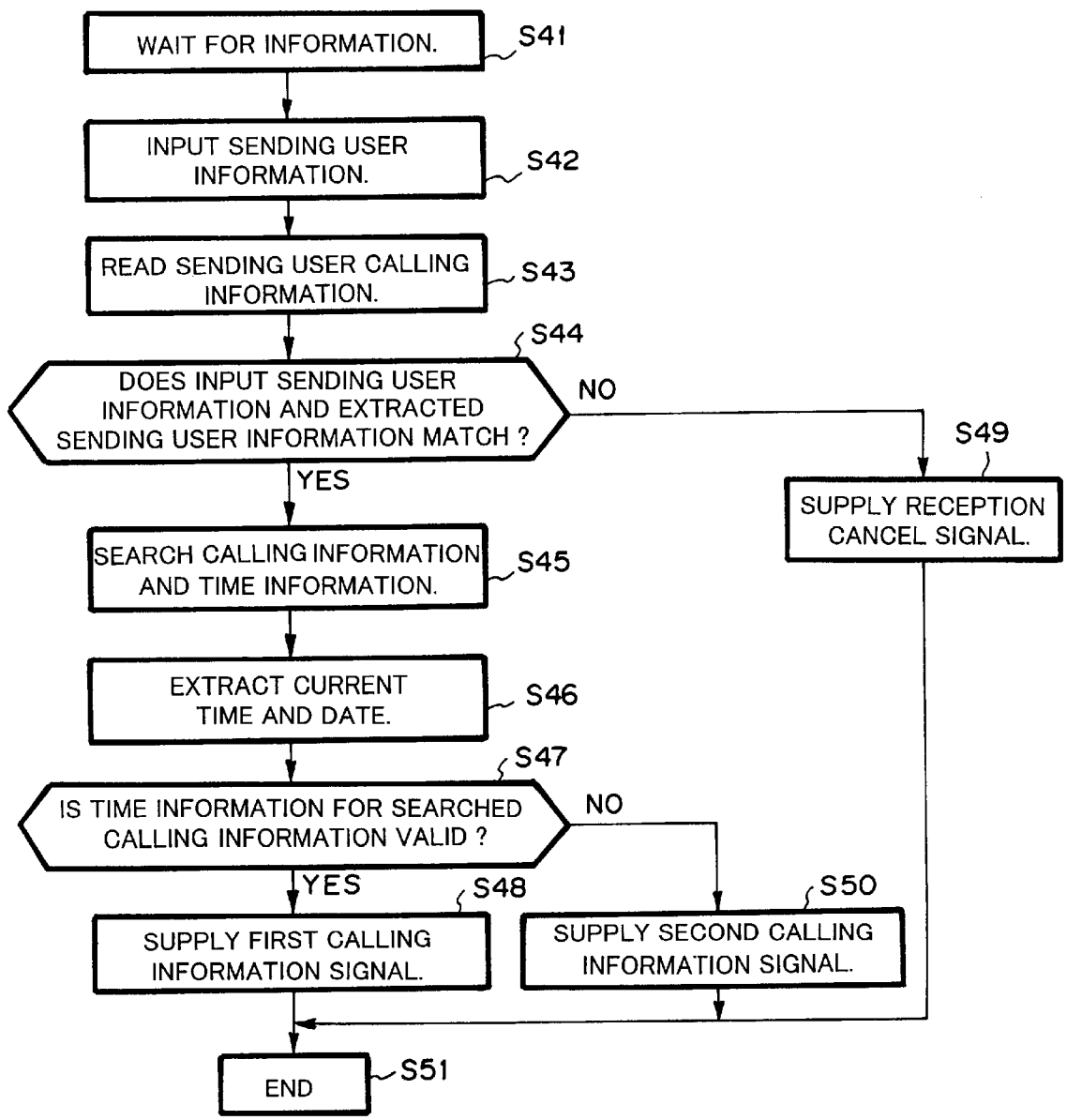

FIG. 6

EXAMPLE OF DATA STRUCTURE IN SENDING USER CALLING INFORMATION STORING PORTION

| RECEPTION PRIORITY LEVEL | NOTIFYING OPERATION | NOTIFYING MEANS | OPERATION TIME RANGE | | CALENDAR INFORMATION 1 | | CALENDAR INFORMATION 2 | |
|---|---|---|---|---|---|---|---|---|
| | | | START | END | START | END | START YEAR/MONTH/DAY | END YEAR/MONTH/DAY |
| A (HIGH) | ○ (ACTIVE) | ◁ (SOUND) | 00:00 | 24:00 | SUN | SAT | 97 08 01 | — (ENDLESS) |
| B (MIDDLE) | ○ | ≈ (VIBRATION) | 8:00 | 17:30 | MON | FRI | 97 09 01 | — |
| | × (INACTIVE) | — (NOT RECEIVED) | (TIME RANGE OTHER THAN 0; 24 H ON SAT AND SUN) | | SAT | SUN | — | (ABOVE DATA) |
| C (MIDDLE) | ○ | ≈ | 10:00 | 20:00 | SAT | SUN | 97 07 21 | 97 08 31 |
| | ○ | ♪1 (MUSICAL 1) | 08:00 | 10:00 | (ABOVE DATA) | — | — | (ABOVE DATA) |
| | ○ | ♪1 (MUSICAL 2) | 20:00 | 22:00 | — | — | — | — |
| | × | ⋈ (RECEIVED) | (TIME RANGE OTHER THAN 0; MON THROUGH FRI) | | MON | FRI | — | — |
| ⋯ | | | | | | | | |
| E (LOW) | ○ | ✉ (MESSAGE STORED) | 00:00 | 24:00 | SUN | SAT | 97 08 01 | — |

EACH DATA IS RECORDED CORRESPONDING TO RECEPTION

```
[ MODE - 1 ]
<A>  ○00:00—24:00   ⊄   SUN—SAT   97/08/01-∞
```

```
[ MODE - 1 ]
<A>  ○00:00—24:00   ⊄    SUN—SAT   97/08/01-∞
<B>  ○08:00—17:30   ≋    MON—FRI   97/09/01-∞
     ×                   SAT—SUN
<C>  ○10:00—20:00   ≈    SAT—SUN   97/07/21-97/08/31
     ○08:00—10:00   ♪1
     ○20:00—24:00   ♪2
     ×              ⊄    MON—FRI                    ▶
```

```
[ MODE - 1 ]
<E>  ○00:00—24:00   ☞   SUN—SAT   97/08/01-∞
<F>  ◀
```

FIG.9

[MODE-1]

<A>  ○00:00—24:00   ⊲   SUN—SAT   97/08/01—∞
<B>  ○08:00—17:30   ≈   MON—FRI   97/09/01—∞
      ×                   SAT—SUN
<C>  ○10:00—20:00   ≈   SAT—SUN   97/07/21-97/08/31

[MODE-1]

<A>  ○00:00—24:00   ⊲    SUN—SAT   97/08/01—∞
<B>  ○08:00—17:30   ♪1   MON—FRI   97/09/01—∞
      ×                    SAT—SUN
<C>  ○10:00—20:00   ≈    SAT—SUN   97/07/21-97/08/31
      ○08:00—10:00   ♪1
      ○20:00—22:00   ♪2
      ×              ⋪   MON—FRI

EXAMPLE OF DATA STRUCTURE IN SENDING USER STORING PORTION

| RECEPTION PRIORITY LEVEL | SENDING USER |
|---|---|
| A | AA BB CC DD EE FF GG |
| B | AB AC AD |
| ⋮ | ⋮ |
| E | ZZ ZY |

RECEPTION PRIORITY LEVELS (A THROUGH E) HAVE BEEN ASSIGNED TO SENDING USERS (AA THROUGH ZY).

FIG.15A

```
[ M O D E - 1 ]
  <A> : AA  BB  CC  DD  EE  FF  GG
        ○00:00—24:00    ◁)    SUN—SAT   97/08/01-∞

<B> : AA  AC  AD
        ○08:00—17:30    ≈     MON—FRI   97/09/01-∞
        ×                     SAT—SUN
                                                         ▶
```

FIG.15B

```
[ M O D E - 1 ]
  <E> : ZZ  ZY
        ○00:00—24:00    ☞    SUN—SAT   97/08/01-∞

```
[ M O D E - 1 ]
  <A> : AA  BB  CC  DD  EE  FF  GG
        ○00:00—24:00    ◁)    SUN—SAT   97/08/01-∞

<B> : AA  AC  AD
        ○08:00—17:30    ▨≈    MON—FRI   97/09/01-∞
        ×                     SAT—SUN
                                                         ▶
```

FIG.17

[MODE- DIRECTORY]

[MODE-1]

<A> : AA BB CC DD EE FF GG
  ○ 00:00—24:00   🔊   SUN—SAT   97/08/01—∞

<B> : AB AC AD DD
  ○ 08:00—17:30   ≈    MON—FRI   97/09/01—∞
  ×                     SAT—SUN

▶

RADIO SELECTIVE CALLING RECEIVER AND PORTABLE TELEPHONE APPARATUS FOR EFFICIENTLY MANAGING RECEIVED CALL

BACKGROUND OF THE INVENTION

1. Field of the Invention

The present invention relates to a radio selective calling receiver, in particular, to a controlling means that the user of the receiver sets up a receiving operation and a reception notifying operation for each sending user. The present invention also relates to a setup controlling means that is disposed in a TDMA type or CDMA type portable telephone unit.

2. Description of the Related Art

A conventional radio selective calling receiver (a well-known pager, an IS-136, an IS-95, FLEX, FLEX-TD, a pocket-bell, a PDC(Personal Digital Cellular) and so forth) (hereinafter referred to as receiver) has a plurality of notifying means such as a sounding means (for example, a speaker), a vibrating means (for example, a motor), and a lighting means (for example, an LED). One notifying means is used for all received signals. Alternatively, a plurality of calling numbers are assigned respective notifying means.

In recent years, a receiver with a password-protected reception notification controlling function has been accomplished. Such a receiver has been disclosed in for example Japanese Patent Laid-Open Publication No. 6-152499. In this receiver, a sending user can be identified with a password and time data.

FIG. 1 is a block diagram showing an example of the structure of a receiver corresponding to the above-described related art reference. In the receiver, a signal is received from an antenna 201. The received signal is supplied to a radio portion 202.

The radio portion 202 demodulates the received signal. The demodulated data is input to a controlling portion 203. Under the control of the controlling portion 203, a selective calling number collating portion 205 collates a selective calling number contained in the received data and a local selective calling number stored in an ID-ROM 204.

When they match, a password collating portion 207 collates a character string contained in a received massage of the received data and a password stored in a password storing portion 206. When they match, a notifying portion 209 notifies the user of the received data. When they do not match, the controlling portion 203 compares the current time counted by a clock portion 212 and notification restriction time and restriction cancellation time that have been set to a setup time storing portion 208 so as to determine whether the notification of the received data has been restricted.

When the notification of the received data has not been restricted, the notifying portion 209 notifies the user of the received data. When the notification of the received data has been restricted, the received message is stored to a message storing portion 211. After the notification of the received message has been canceled, the notifying portion 209 notifies the user of the received data.

In the above-described radio selective calling receiver, a plurality of reception priority levels and notifying means can be assigned to each sending user. In addition, the receiver has the reception notification restricting function for restricting reception notification corresponding to each time range. However, when there are a large number of sending users, it is troublesome to assign notifying means and valid time to the sending users. In other words, it is difficult to manage (newly register, change, delete, and check) notifying means and notification valid time ranges for these sending users.

SUMMARY OF THE INVENTION

The present invention is made from the above-described point of view. An object of the present invention is to provide a radio selective calling receiver that allows the user of the receiver to conveniently and easily manage reception priority levels, notifying means, and notification valid time ranges.

The present invention is a radio selective calling receiver for receiving a radio calling signal containing a local calling number and for notifying the receiving user of the received radio calling signal, comprising a receiving means for receiving the radio calling signal containing sending user information that allows the receiving user to identify the sending user and assign a priority level to the sending user, a plurality of types of notifying means for notifying the receiving user of the received radio calling signal in different manners, a time counting means for setting up and counting the current time and date, an information storing means for setting up and storing notification state information and time information through information inputting means and information displaying means for the receiving user, the notification state information representing a receiving operation and a notifying operation of the radio calling signal, the time information representing a valid date range and a valid time range of the receiving operation and the notifying operation, and a controlling means for searching and collating sending user information stored in the information storing means corresponding to the sending user information contained in the received radio calling signal, for searching the notification state information and the time information stored in the information storing means corresponding to the collated result, for comparing the searched time information and the current time and date of the time counting means, for determining whether or not the receiving operation and the notifying operation are valid corresponding to the compared result, and for controlling the notifying operations of the plurality of types of notifying means corresponding to the searched notification state information.

The radio selective calling receiver further comprises a setup controlling means for operating and managing initial setting operation, a changing operation, a registering operation, and a deleting operation for the notification state information and the time information on the same screen of the displaying means. The information storing means stores a plurality of types of notification state information and time information for the same sending user information. The setup controlling means operates and manages a plurality of types of notification state information and time information on the same screen.

The radio selective calling receiver further comprising a means for setting up and storing a plurality of sending users for the sending user information. The radio selecting calling receiver further comprising a first searching and controlling means for preventing a plurality of sending users for the sending user information and the sending user information from being redundantly registered, and a second searching and controlling means for preventing the time information corresponding to the sending user information from being inconsistent with the current time and date.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1 is a block diagram showing the structure of a conventional radio selective calling receiver;

FIGS. 2A and 2B are block diagrams showing the structures of receivers according to a first embodiment of the present invention;

FIG. 3 is a flow chart showing an example of a sending user calling information managing process according to the present invention;

FIG. 5 is a flow chart showing an example of a receiving process of a sub-controlling portion;

FIG. 6 is a schematic diagram showing an example of a data structure in a sending user calling information storing portion shown in FIGS. 2A and 2B;

FIG. 9 is a schematic diagram showing an example of a setup screen of sending user calling information according to the present invention;

FIG. 10 is a schematic diagram showing an example of a setup screen of sending user calling information according to the present invention;

FIG. 14 is a schematic diagram showing a data structure in a sending user storing portion according to the second embodiment;

FIGS. 15A and 15B are schematic diagrams showing examples of setup screens of sending users and sending user calling information according to the second embodiment FIG. 16 is a schematic diagram showing an example of a setup screen of sending users and sending user calling information according to the second embodiment;

FIG. 17 is a schematic diagram showing an example of a setup screen of sending users and sending user calling information according to the second embodiment; and FIG. 18 is a schematic diagram showing an example of a setup screen of sending users and sending user calling information according to the second embodiment.

DESCRIPTION OF PREFERRED EMBODIMENTS

Figure 4:
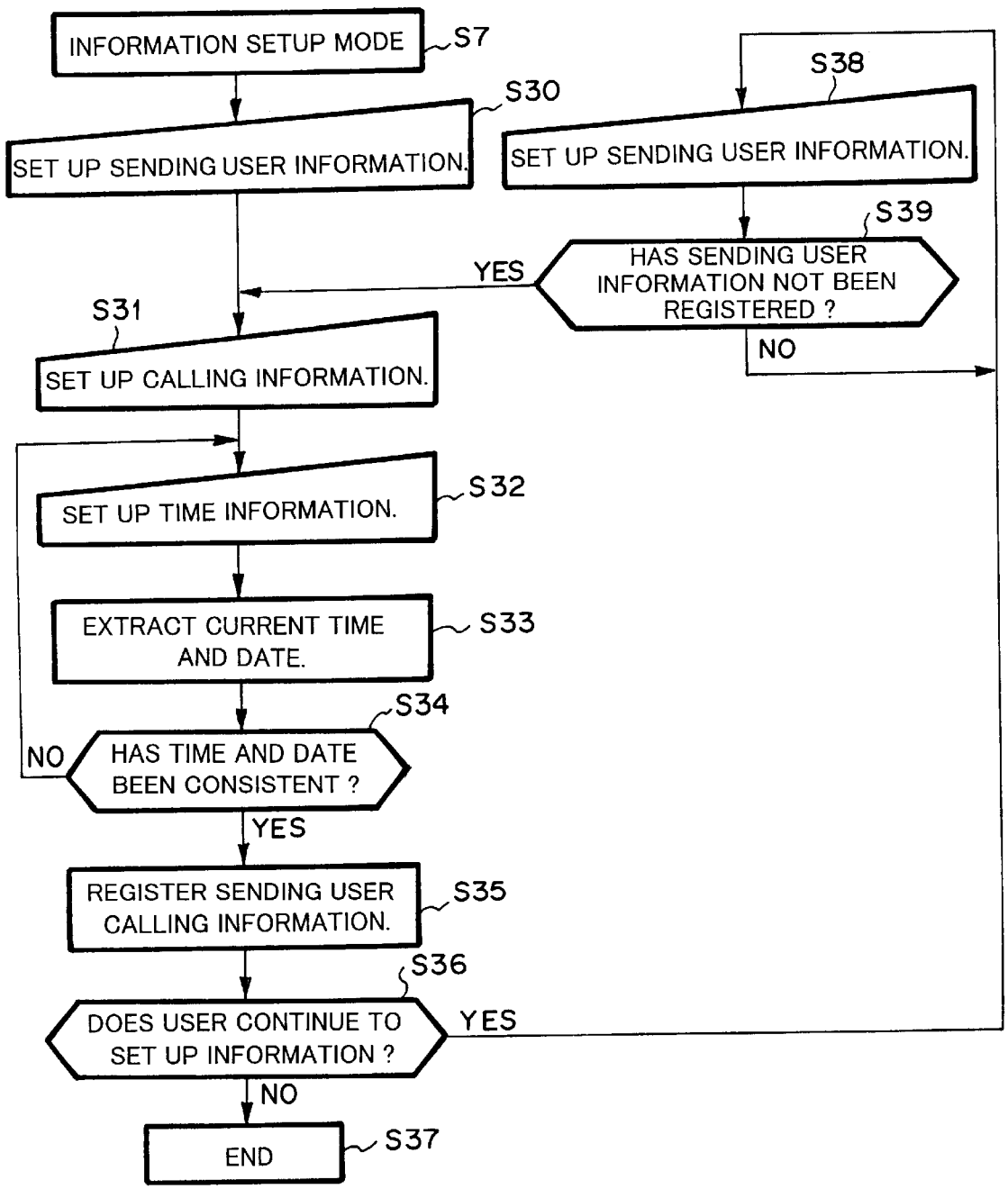
FIG. 4 is a flow chart showing an example of a sending user calling information setting process according to the present invention.

Next, with reference to the accompanying drawings, embodiments of the present invention will be described.

First Embodiment

FIGS. 2A and 2B are block diagrams showing examples of the structures of receivers according to a first embodiment of the present invention. In FIG. 2A, a radio selective calling receiver (hereinafter referred to as receiver) according to the first embodiment comprises a radio portion 1, a main controlling portion 2, an ID-ROM portion 3, a message storing portion 6, a data inputting portion 7, a sending user calling information storing portion 10, a sub-controlling portion 9, a clock-calendar portion 8, a reception notifying portion 4, and a displaying portion 5. The radio portion 1 receives and demodulates a radio calling signal.

The main controlling portion 2 processes a received signal and controls a receiving operation and so forth. The ID-ROM portion 3 stores a local calling number and so forth. The message storing portion 6 stores a received message and so forth. The data inputting portion 7 inputs sending user information and so forth. The sending user calling information storing portion 10 sets up and stores sending user information, calling information corresponding thereto, and time information for validating the calling information.

The sub-controlling portion 9 compares sending user information contained in a received signal and sending user information stored in the sending user calling information storing portion 10, searches calling information and time information therefrom, and performs a controlling operation corresponding to the calling information. The clock-calendar portion 8 counts time and date. The reception notifying portion 4 notifies the user of received data. The displaying portion 5 outputs visible information to the user.

As notifying means of the reception notifying portion 4, a sounding means (for example, a speaker), a vibrating means (for example, a vibrating motor), a lighting means (for example, an LED), and so forth can be used.

FIG. 2B shows the structure of which a portable telephone apparatus comprised the selective calling receiver shown in FIG. 1 and a radio transmitter/receiver is combined with a portable telephone unit that mutually communicates voice and data therewith.

A radio portion 1 has a transmitting portion 1a and a receiving portion 1b. The transmitting portion 1a is connected to an antenna 1d through a combining-branching portion 1c. The transmitting portion 1a modulates a base band signal corresponding to assigned frequency and slot under the control of a main controlling portion 2a and transmits the resultant radio wave to a base station. The receiving portion 1b converts a signal received from the combining-branching portion 1c into a base band signal. The receiving portion 1b is used in common with a receiving portion of the selective calling receiver. The main controlling portion 2a determines whether the received signal is for the selective calling receiver or the portable telephone unit corresponding to the reception frequency, the data type, and so forth, executes a signal process corresponding to the determined result, and adaptively outputs the resultant signal.

The receiver shown in FIG. 2B also has a microphone 12 and a speaker 13. The microphone 12 converts an audio signal into an electric signal. The speaker 13 outputs an audio signal. With the microphone 12 and the speaker 13, a message can be transmitted and received as an audio signal. Thus, the portable telephone unit can be provided with many functions as well as features of small size and light weight. A reception notifying portion 4 and the speaker 13 may be structured in common. In addition, information stored in a message storing portion 6 may be output from the speaker 13.

The function as a radio selecting calling receiver (or a pager) of the portable telephone unit shown in FIG. 2B is the same as that shown in FIG. 2A. The reception setup conditions and other setup conditions of the portable telephone unit are the same as those that will be describe later.

Next, the operation of the receiver according to the first embodiment of the present invention will be described.

Considering particular sending user information for assigning priority levels to individual sending users and sending user groups, the user of the receiver operates the data inputting portion 7 through the main controlling portion 2 and the sub-controlling portion 9 so as to set up calling information (immediate notification mode, message hold and notification stop mode, and so forth) and a calling information valid time range. The sending user calling information is stored in the sending user calling information storing portion 10. Calling information and time information corresponding to sending user information can be stored as a plurality of information items for each sending user. After the current time and date are set up to the clock-calendar portion 8, it counts the current time.

A sending user transmits sending user information as well as a calling number of the receiver and a message. The sending user information has been arranged between the sending user and the receiving user.

The transmitted information as a radio signal is received and demodulated by the radio portion 1. The demodulated data is supplied to the main controlling portion 2. The main controlling portion 2 collates a calling number contained in the received data and a local calling number stored in the ID-ROM portion 3. When they match, the main controlling portion 2 extracts a message signal and a sending user information signal preceded by the calling number and supplies the extracted message signal and sending user information signal to the sub-controlling portion 9.

The sub-controlling portion 9 collates sending user information stored in the sending user calling information storing portion 10 and the sending user information signal received from the main controlling portion 2. When they match, the sub-controlling portion 9 extracts calling information and time information from the stored sending user information and compares/collates the extracted time information and current time and date counted by the clock-calendar portion 8. The sub-controlling portion 9 supplies a calling information signal for a calling means corresponding to the matched time information to the main controlling portion 2. The main controlling portion 2 causes the displaying portion 5 to display a message corresponding to the calling information signal and the reception notifying portion 4 to operate.

FIG. 6 shows an example of a data structure in the sending user calling information storing portion 10. Corresponding to reception priority levels A, B, . . . E, notifying operation, notifying means, operation time range (start time and end time), calendar information 1 (start day and end day), calendar information 2 (state date and end date) are recorded.

In FIG. 6, "O icon" in notifying operation field represents that the receiver can receive a signal and notify the user of the received signal. "X icon" represents that the receiver does not receive a signal or can receive a signal but does not notify the user of the received signal. "Speaker icon" in notifying means field represents that the receiver uses a speaker sound (conventional beeping sound). "Note 1 icon" and "note 2 icon" represent that the receiver uses a speaker sound in note 1 and a speaker sound in note 2, respectively. "≈icon" represents that the receiver uses a vibration of a vibrating motor. "Speaker icon with slant line" represents that the receiver uses a character notification rather than a sound notification. "Pen icon" represents that the receiver uses neither a reception notification nor a character notification, but stores received data in the memory.

Figures 7, 8A, 8B:
FIG. 7 is a schematic diagram showing an example of a setup screen of sending user calling information according to the present invention.
FIGS. 8A and 8B are examples of setup screens of sending user calling information according to the present invention.

FIGS. 7, 8A, 8B, 9, and 10 show examples of setup screens of sending user calling information. FIG. 7 shows the case that a normal sound notification (calling information) with a speaker (speaker icon) every day [SUN–SAT] for 24 hours [00:00–24:00] from Aug. 1, 1997 (endless) [97/08/01–∞] has been assigned to sending user information <A>. FIGS. 8A and 8B show the case that notification information has been assigned to sending user information <B>, <C>, . . . , <E> on two pages (notification information has not been assigned to sending user information <F>). All the sending user calling information can be managed on these screens. In this example, notifying means for sending user information <B> is being changed (reverse indication at cursor position).

FIG. 3 is a flow chart showing an example of a sending user calling information managing process according to the present invention.

In FIG. 3, in normal reception standby state at step S1, the user selects information management mode in the receiver at step S2. The sub-controlling portion 9 searches sending user calling information from the sending user calling information storing portion 10 at step S3 and determines whether the sending user calling information has not been set up at step S4. When the sending user calling information has not been set up, the sub-controlling portion 9 determines whether or not the user wants to set up the sending user calling information at step S5. When the determined result at step S4 is No, the user selects desired information at step S6. FIGS. 8A and 8B show examples of screens in the sending user calling information managing process. Thus, the user can easily check information that has been set up.

At step S5, when the determined result at step S5 is No, the flow returns to step S1. When the determined result at step S5 is Yes, the flow advances to step S7. At step S7, the sub-controlling portion 9 performs information setup process.

After the user has decided the selected information at step S8, the sub-controlling portion 9 determines whether or not the user has acknowledged the changed information at step S9. When the determined result at step S9 is No, the flow returns to step S1.

When the determined result at step S9 is Yes, the sub-controlling portion 9 determines whether the changed information is sending user information, calling information, or time information at step S10 and displays available alternatives at step S11, S12, or S13.

FIG. 9 shows examples of available alternatives displayed in the case that the notifying means change for the sending user information <B> has been selected (an example at step S12). In this case, the notifying means is changed from a vibrating notification (≈indication) to a musical notification (note indication).

When the determined result at step S10 is sending user information, when the user selects information to be changed at step S14, the sub-controlling portion 9 determines whether the changed sending user information has not been registered (for example, when the sending user information <A> is changed to <H>, the sub-controlling portion 9 determines whether the sending user information <H> has not been registered) at step S17. When the determined result at step S17 is Yes, the flow advances to step 618. At step S18, the sub-controlling portion 9 determines whether or not user has acknowledged the changed information. When the determined result at step S17 is No, the flow returns to step S14.

When the determined result at step S10 is calling information, when the user selects desired information at step S15, the flow advances to step S18. At step S18, the sub-controlling portion 9 determines whether or not the user has acknowledged the changed information.

When the determined result at step S10 is time information, the user changes the time information at step S16. Thereafter, the flow advances to step S19. At step S19, the sub-controlling portion 9 extracts the current time and date from the clock-calendar portion 9 and determines whether the changed time information is consistent (namely, when the time range from Oct. 1, 1997 to Oct. 31, 1997 has been set up, if the current date is Sep. 1, 1997, the changed time information is inconsistent) at step S20. When the determined result at step S20 is Yes, the flow advances to step S18. At step S18, the sub-controlling portion 9 determines whether or not the user has acknowledged the changed information. When the determined result at step S20 is No, the flow returns to step S16.

When the determined result at step S18 is Yes, the sub-controlling portion 9 stores the changed information to the sending user calling information storing portion 10 at step S21. Thus, the sub-controlling portion 9 completes the information setup changing process at step S22. When the determined result at step S18 is No, the flow returns to step S1. FIG. 9 shows an example of a screen in the case that setup information has been changed.

FIG. 4 is a flow chart showing an example of a sending user calling information setup process according to the present invention.

At step S7 shown in FIG. 3, the receiver enters the All information setup mode. Thereafter, the flow advances to step S30. At step S30, the user sets up sending user information so as to assign a priority level to a sending user. Thereafter, the user sets up desired calling information (notifying method and so forth) corresponding to the sending user information at step S31. Next, the user sets up desired time information (start time, end time, and so forth) for validating the calling information at step S32.

The sub-controlling portion 9 extracts the current time and date from the clock-calendar portion 9 at step S33 and determines whether or not the time information that has been set up is consistent at step S34. When the determined result at step S34 is Yes, the sub-controlling portion 9 registers the time information to the sending user calling information storing portion 10 at step S35. Thereafter, the sub-controlling portion 9 determines whether the user continues to set up sending user calling information at step S36. When the determined result at step S36 is No, the flow advances to step S37. At step S37, the sub-controlling portion 9 completes the information setup mode.

When the determined result at step S36 is Yes, the flow advances to step S38. At step S38, the user sets up sending user information. At step S39, the sub-controlling portion 9 determines whether or not the setup sending user information has not been registered. When the determined result at step S39 is Yes, the flow returns to step S31. When the determined result at step S39 is No, the flow returns to step S38.

FIG. 5 is a flow chart showing an example of a receiving process of the sub-controlling portion 9.

In FIG. 5, at step S41, the sub-controlling portion 9 waits for information. A sending user information signal is input from the main controlling portion 2 to the sub controlling portion 9. The sub controlling portion 9 extracts sending user calling information from the sending user calling information storing portion 10 at step S43 and collates the input sending user information signal and the extracted sending user information at step S44.

When they match, the sub-controlling portion 9 extracts calling information and time information from the input sending user calling information at step S45 and extracts the current time and date from the clock-calendar portion 8 at step S46.

The sub-controlling portion 9 determines whether or not the time information extracted at step S45 and the current time are consistent at step S47. When the determined result at step S47 is Yes, the sub-controlling portion 9 supplies the extracted calling information as a first calling information signal to the main controlling portion 2 at step S48.

When the determined result at step S47 is No, the sub-controlling portion 9 supplies a second calling information signal to the main controlling portion 2 so as to suspend the reception notification until the valid setup time and store only the message to the message storing portion 6 at step S50.

When the determined result at step S44 is No, the sub-controlling portion 9 supplies a reception cancel signal to the main controlling portion 2 at step S49. In this case, the reception cancel signal represents that sending user information has not been registered.

After the sub-controlling portion supplies the first calling information signal at step S48, the second calling information signal at step S50, or the reception cancel signal at step S49 to the main controlling portion 2, the sub-controlling portion 9 completes the receiving process at step S51. Thereafter, the flow returns to step S41.

Second Embodiment

Next, a second embodiment of the present invention will be described.

Figure 11:
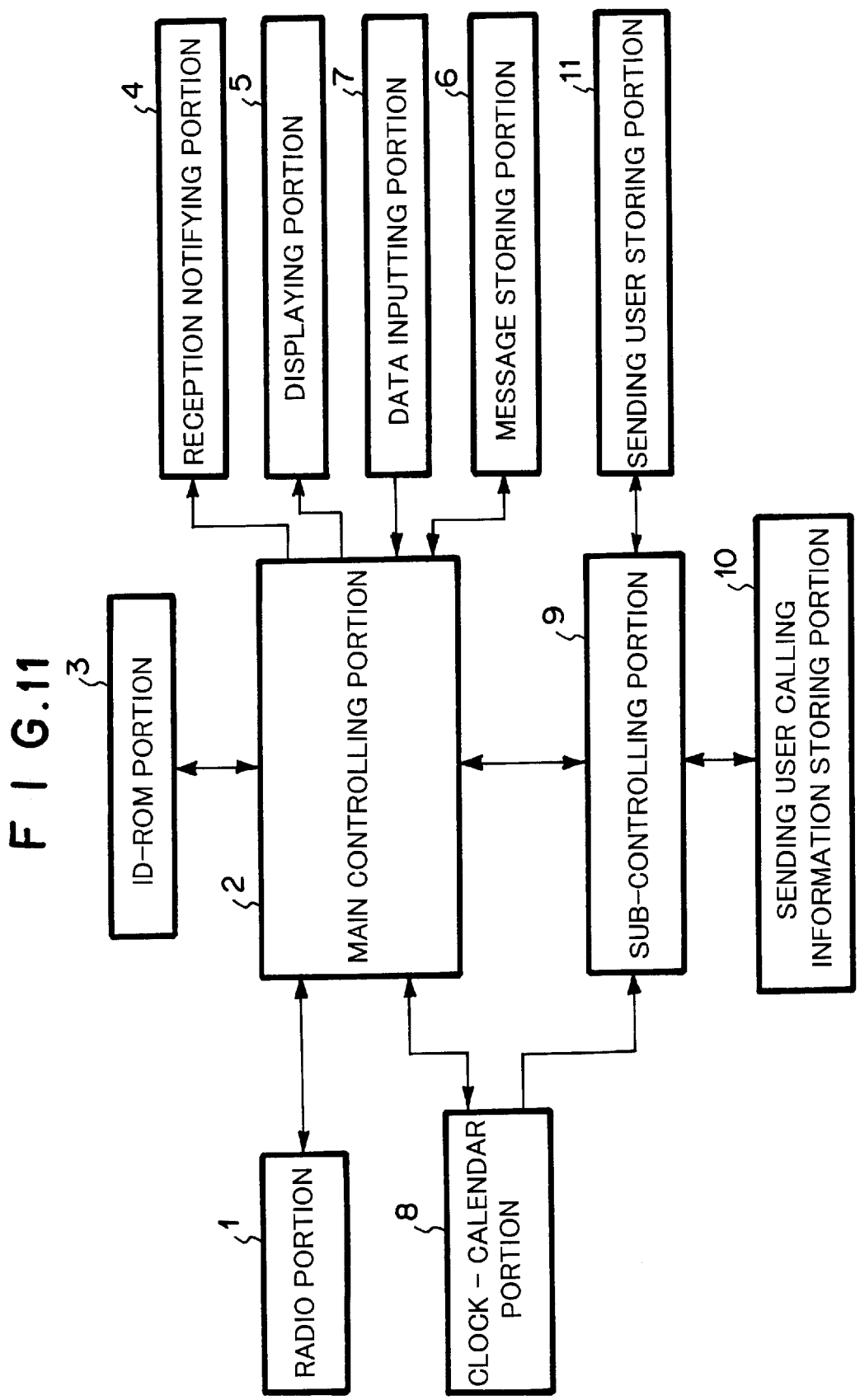
FIG. 11 is a block diagram showing the structure of a receiver according to a second embodiment of the present invention.

FIG. 11 is a block diagram showing the structure of a receiver according to the second embodiment of the present invention. The receiver shown in FIG. 11 comprises a radio portion 1, a main controlling portion 2, an ID-ROM portion 3, a message storing portion 6, a data inputting portion 7, a clock-calendar portion 8, a reception notifying portion 4, and a displaying portion 5 that have the same functions and operations as those of the receiver shown in FIGS. 2A and 2B. For simplicity, their description will be omitted. In the first embodiment, sending user information should be managed in detail. On the other hand, in the second embodiment, in addition to the above-described sub-controlling portion 9 and the sending user calling information storing portion 10, a sending user storing portion 11 is disposed. The sending user storing portion 11 stores the relation between sending users and sending user information.

Figure 12:
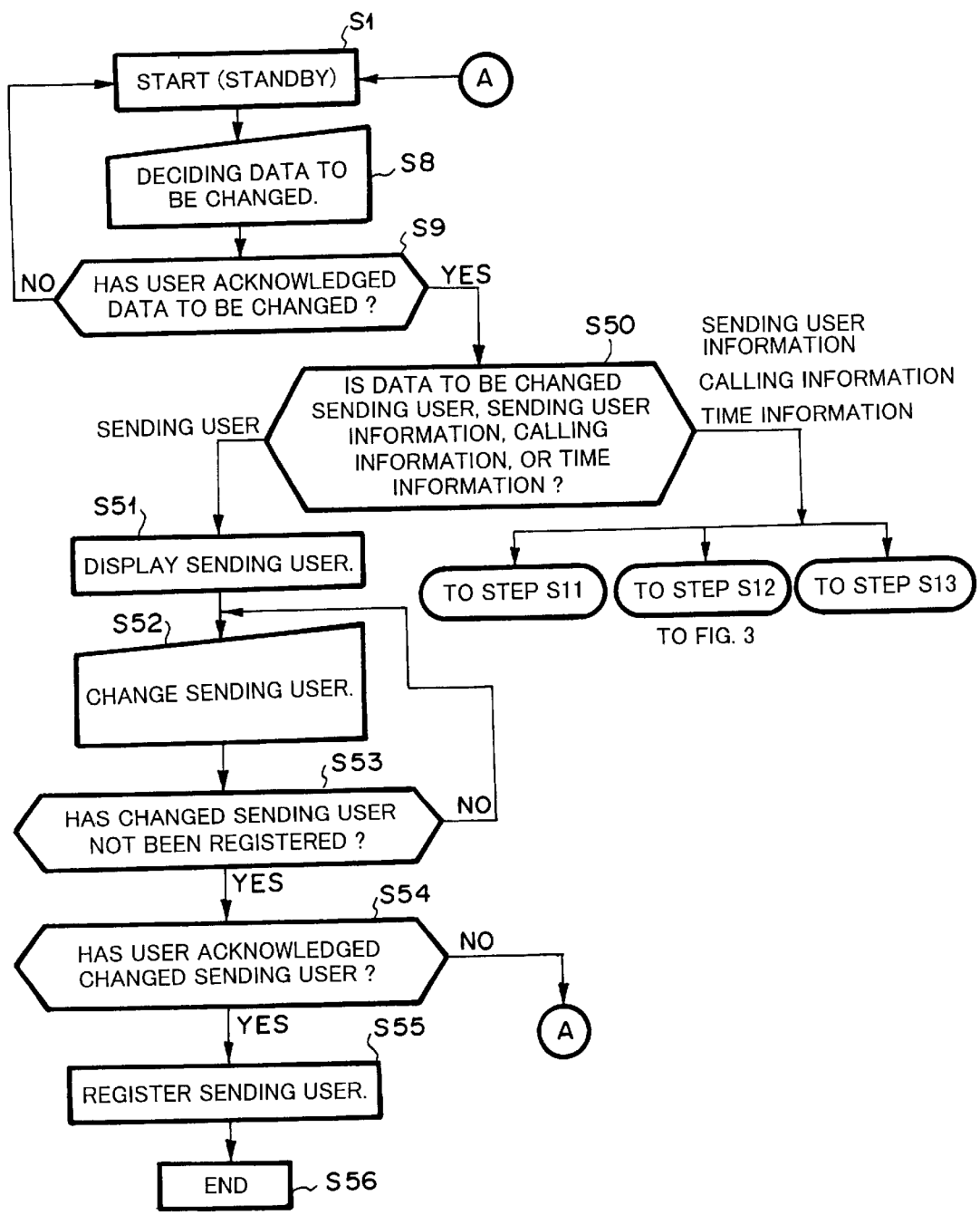
FIG. 12 is a flow chart showing an example of a sending user calling information managing process according to the second embodiment.

FIG. 12 is a flow chart showing an example of a sending user calling information managing process of the receiver according to the second embodiment. Next, major different portions between the first embodiment and the second embodiment will be described.

The sub-controlling portion 9 determines whether information changed at step S8 shown in FIG. 3 is a sending user, sending user information, calling information, or time information at step S50. Thereafter, the sub-controlling portion 9 displays available alternatives of the relevant information at step S11, S12, S13, or S51.

When the determined result at step S50 is a sending user, the user selects relevant information at step S52. Thereafter, the flow advances to step S53. At step S53, the sub-controlling portion 9 determines whether the changed sending user has not been registered (for example, when a sending user ZZ is added to sending user information <A>, the sub-controlling portion 9 determines whether the sending user ZZ has not been set up to sending user information <E>) at step S53. When the determined result is Yes, the sub-controlling portion 9 determines whether or not the user has acknowledged the changed sending user at step S54.

When the determined result at step S54 is Yes, the sub-controlling portion 9 stores the changed information to the sending user storing portion 11 at step S55. Thus, the sub-controlling portion 9 completes the information setup changing process at step S56.

When the determined result at step S53 is No, the flow returns to step S52.

When the user changes sending user information, calling information, or time information, the sub-controlling portion 9 performs the process shown in FIG. 3.

Figure 13:
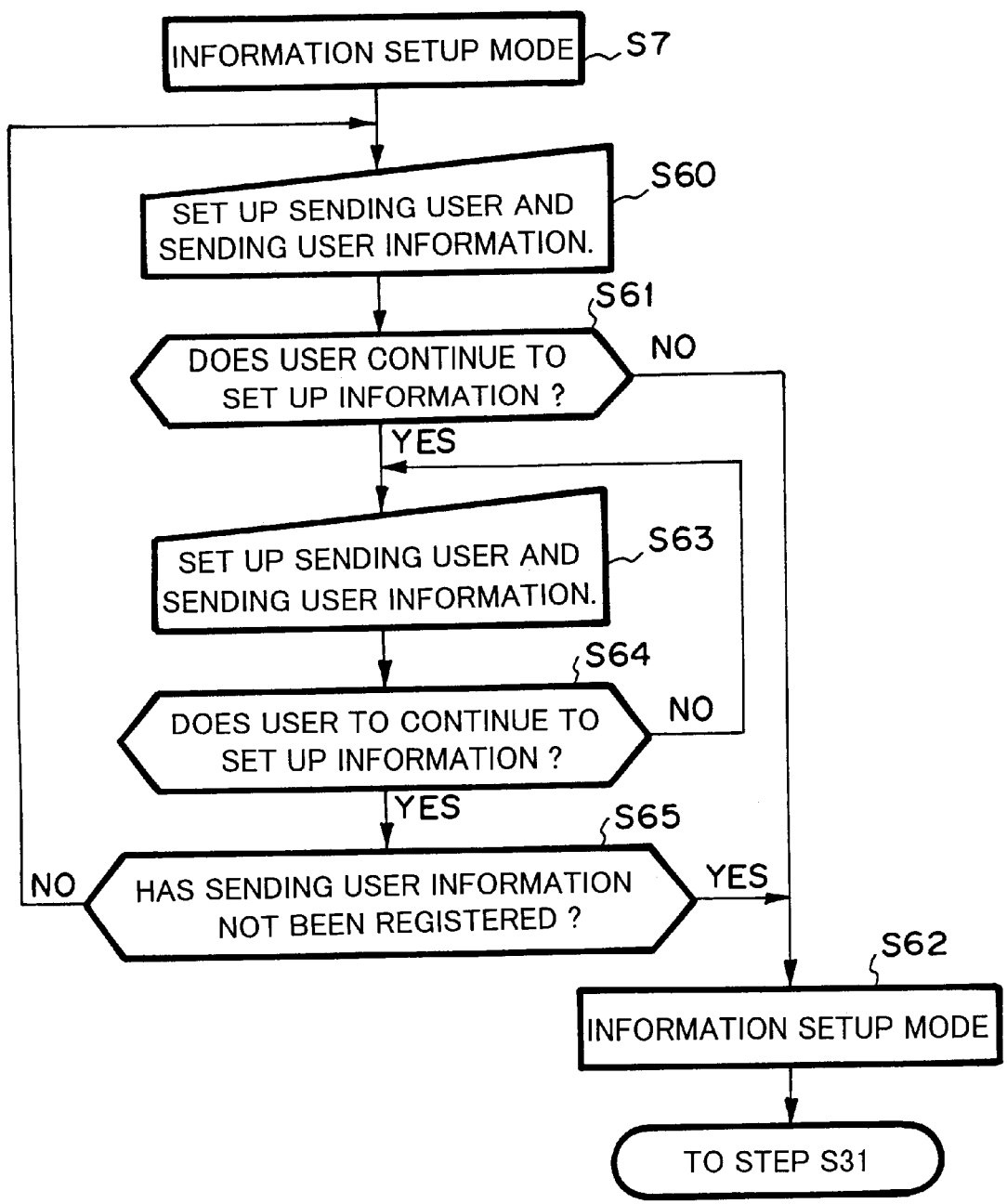
FIG. 13 is a flow chart showing an example of a sending user calling information setting process according to the second embodiment of the present invention.

FIG. 13 is a flow chart showing an example of a sending user/sending user calling information setup process of the receiver according to the second embodiment.

In FIG. 13, the receiver enters information setup mode at step S7. The flow advances to step S60. At step S60, the user sets up a sending user and sending user information for identifying the sending user. Thereafter, the sub-controlling portion 9 determines whether or not the user sets up a plurality of sending users (continue to set up a sending user) at step S61.

When the determined result at step S61 is No, the sub-controlling portion 9 stores one sending user as one sending user information record to the sending user storing portion 11 at step S62. Thereafter, the flow advances to step S31 shown in FIG. 4.

When the determined result at step S61 is Yes, the flow advances to step 563. At step 563, the user sets up a sending user and sending user information thereof. Thereafter, the flow advances to step S64. At step S64, the sub-controlling portion 9 determines whether the setup sending user information has not been registered at step S65. When the determined result at step S65 is Yes, the sub-controlling portion 9 stores a plurality of sending users as one sending user information record to the sending user storing portion 11 at step S62. When the determined result is No, the flow returns to step S60.

FIG. 14 shows an example of a data structure in the sending user storing portion 11. In the sending user storing portion 11, reception priority levels A, B, . . . , E have been assigned to sending users AA, BB, . . . , ZZ.

FIGS. 15A and 15B show example of setup screens of sending users and sending user calling information thereof. Since sending users are added to sending user calling information, the sending users can be easily identified.

A telephone directory function may be added to the sending user storing portion 11. In this case, when a sending user registered to the sending user information or changed in the sending user information, even if the sending user information is registered or changed on a telephone directory screen, information changed on the telephone directory screen can be changed on the screen shown in FIG. 15 in the process from steps S50 to S55 shown in FIG. 12 or in the setup/registering process from steps S60 to S62 shown in FIG. 13.

FIGS. 16, 17, and 18 show examples of sending user information setup screens as telephone directory screens. FIG. 16 shows an example of a current setup screen. FIG. 17 shows an example of a telephone directory screen of which sending user information has been changed. FIG. 18 shows an example of a sending user information setup screen that has been changed.

As described above, in the radio selective calling receiver according to the present invention, sending user information for identifying a sending user, calling conditions for setting up reception priority levels, notifying means, and so forth, and time information for validating setups are independently stored. With a means for combining such information, various information can be easily registered, changed, and managed.

According to the present invention, various information is set up in advance. Thereafter, all information is read and displayed. Thus, desired information can be properly managed on a screen. Consequently, the user of the receiver can easily set up information of a plurality of sending users, receiving means, reception notifying means, and restriction of a reception time range. Thereafter, the user can easily manage (for example change and check) such information.

In addition, since there are means that allow the user of the receiver to identify a sending user, to assign receiving priority levels and reception notification priority levels of sending user information, and to set and control receiving means and reception notifying means corresponding to individual time ranges. Thus, information transmitted by important sending users can be received and notified in higher priority levels than other information. When the user of the receiver controls reception time ranges along with sending users, important information can be securely received with a plurality of reception notifying means without need to increase discrete calling numbers.

In addition, since the user of the receiver can register sending users, he or she can prevent the receiver from receiving information other than the registered sending users. Moreover, since the user of the receiver can identify and register each sending user, he or she can more easily register and change various data than he or she sets up a password. Thus, the user of the receiver can prevent the receiver from receiving mischievous or mistaken calls without need to set up a password.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A radio selective calling receiver for receiving a radio calling signal containing a local calling number and for notifying the receiving user of the received radio calling signal, comprising:

receiving means for receiving the radio calling signal containing sending user information that allows the receiving user to identify the sending user and assign a priority level to the sending user;

a plurality of types of notifying means for notifying the receiving user of the received radio calling signal in different manners;

time counting means for setting up and counting the current time and date;

information storing means for setting up and storing notification state information and time information through information inputting means and information displaying means for the receiving user, the notification state information representing a receiving operation and a notifying operation of the radio calling signal, the time information representing a valid date range and a valid time range of the receiving operation and the notifying operation; and controlling means for searching and collating sending user information stored in said information storing means corresponding to the sending user information contained in the received radio calling signal, for searching the notification state information and the time information stored in said information storing means corresponding to the collated result, for comparing the searched time information and the current time and date of said time counting means, for determining whether or not the receiving operation and the notifying operation are valid corresponding to the compared result, and for controlling the notifying operations of said plurality of types of notifying means corresponding to the searched notification state information.

2. The radio selective calling receiver as set forth in claim 1, further comprising:

setup controlling means for operating and managing initial setting operation, a changing operation, a registering operation, and a deleting operation for the notification state information and the time information on the same screen of said displaying means.

3. The radio selective calling receiver as set forth in claim 2, wherein said information storing means stores a plurality of types of notification state information and time information for the same sending user information, and wherein said setup controlling means operates and manages a plurality of types of notification state information and time information on the same screen.

4. The radio selective calling receiver as set forth in claim 2, further comprising:

means for setting up and storing a plurality of sending users for the sending user information.

5. The radio selecting calling receiver as set forth in claim 4, further comprising:

first searching and controlling means for preventing a plurality of sending users for the sending user information and the sending user information from being redundantly registered; and second searching and controlling means for preventing the time information corresponding to the sending user information from being inconsistent with the current time and date.

6. The radio selective calling receiver as set forth in claim 1, wherein said information storing means stores a plurality of types of notification state information and time information for the same sending user information, and wherein said setup controlling means operates and manages a plurality of types of notification state information and time information on the same screen.

7. The radio selective calling receiver as set forth in claim 6, further comprising:

means for setting up and storing a plurality of sending users for the sending user information.

8. The radio selecting calling receiver as set forth in claim 7, further comprising:

first searching and controlling means for preventing a plurality of sending users for the sending user information and the sending user information from being redundantly registered; and second searching and controlling means for preventing the time information corresponding to the sending user information from being inconsistent with the current time and date.

9. The radio selective calling receiver as set forth in claim 1, further comprising:

means for setting up and storing a plurality of sending users for the sending user information.

10. The radio selecting calling receiver as set forth in claim 9, further comprising:

first searching and controlling means for preventing a plurality of sending users for the sending user information and the sending user information from being redundantly registered; and second searching and controlling means for preventing the time information corresponding to the sending user information from being inconsistent with the current time and date.

11. A method for receiving a radio calling signal containing a local calling number and for notifying the receiving user of the received radio calling signal, comprising the steps of:

receiving the radio calling signal containing sending user information that allows the receiving user to identify the sending user and assign a priority level to the sending user;

notifying the receiving user of the received radio calling signal in a plurality of types of different notifying means;

setting up and counting the current time and date by time counting means;

setting up and storing notification state information and time information through information inputting means to a information stored media and information display device for the receiving user;

setting up a notification state information representing a receiving operation and a notifying operation of the radio calling signal and the time information representing a valid date range and a valid time range of the receiving operation and the notifying operation by a setup controlling means;

searching and collating sending user information stored in said information stored media corresponding to the sending user information contained in the received radio calling signal;

searching the notification state information and the time information stored in said information stored media corresponding to the collated result;

comparing the searched time information and the current time and date of the time counting means;

determining whether or not the receiving operation and the notifying operation are valid corresponding to the compared result; and controlling the notifying operations of said plurality of types of notifying means corresponding to the searched notification state information.

12. The method as set forth in claim 11, further comprising the steps of:

operating and managing initial setting operation, a changing operation, a registering operation, and a deleting operation for the notification state information and the time information on the same screen of the display.

13. The method as set forth in claim 11, wherein said information stored media stores a plurality of types of notification state information and time information for the same sending user information, and wherein said setup controlling means operates and manages a plurality of types of notification state information and time information on the same screen.

14. A portable telephone apparatus with a radio selective calling receiver for receiving a radio calling signal containing a local calling number, for notifying the receiving user of the received radio calling signal, and for telephoning with a data communication comprising:

transmitting means for modulating a base band signal to a high frequency signal corresponding to assigned frequency and slot and for transmitting the high frequency signal to a base station;

receiving means for receiving the radio calling signal containing sending user information that allows the receiving user to identify the sending user and assign a priority level to the sending user;

a plurality of types of notifying means for notifying the receiving user of the received radio calling signal in different manners;

time counting means for setting up and counting the current time and date;

information storing means for setting up and storing notification state information and time information through information inputting means and information displaying means for the receiving user, the notification state information representing a receiving operation and a notifying operation of the radio calling signal, the time information representing a valid date range and a valid time range of the receiving operation and the notifying operation; and controlling means for searching and collating sending user information stored in said information storing means corresponding to the sending user information contained in the received radio calling signal, for searching the notification state information and the time information stored in said information storing means corresponding to the collated result, for comparing the searched time information and the current time and date of said time counting means, for determining whether or not the receiving operation and the notifying operation are valid corresponding to the compared result, and for controlling the notifying operations of said plurality of types of notifying means corresponding to the searched notification state information.

15. The portable telephone apparatus as set forth in claim 14, further comprising:

setup controlling means for operating and managing initial setting operation, a changing operation, a registering operation, and a deleting operation for the notification state information and the time information on the same screen of said displaying means.

16. The portable telephone apparatus as set forth in claim 14, wherein said information storing means stores a plurality of types of notification state information and time information for the same sending user information, and wherein said setup controlling means operates and manages a plurality of types of notification state information and time information on the same screen.

* * * * *

UNITED STATES PATENT AND TRADEMARK OFFICE
CERTIFICATE OF CORRECTION

PATENT NO.    : 6,411,827 B1
DATED         : June 25, 2002
INVENTOR(S)   : Shigeki Minata It is certified that error appears in the above-identified patent and that said Letters Patent is hereby corrected as shown below:

Column 6,
Line 64, delete "618" insert -- S18 --

Column 7,
Line 31, delete "All"

Signed and Sealed this

Fifth Day of November, 2002

*Attest:*

*Attesting Officer*

JAMES E. ROGAN
*Director of the United States Patent and Trademark Office*